(12) United States Patent
Elung et al.

(10) Patent No.: US 7,717,518 B2
(45) Date of Patent: May 18, 2010

(54) DRIVER'S ELBOW SUPPORT APPARATUS

(76) Inventors: Francis Nji Elung, 9271 Lapwing Ct., Columbia, MD (US) 21045; Anthony Rollando Robinson, 3506 Suville La., Mitchellville, MD (US) 20721

( * ) Notice: Subject to any disclaimer, the term of this patent is extended or adjusted under 35 U.S.C. 154(b) by 0 days.

(21) Appl. No.: 12/285,255

(22) Filed: Oct. 1, 2008

(65) Prior Publication Data
US 2010/0078530 A1    Apr. 1, 2010

(51) Int. Cl.
*B60N 2/46* (2006.01)
(52) U.S. Cl. ............ 297/411.2; 297/219.1; 297/411.23; 297/411.4; 297/464; 297/488; 5/653; 5/654; 5/655.3; 280/751
(58) Field of Classification Search ............. 297/411.2, 297/411.4, 411.21, 411.23, 411.24, 488; 297/219.1–228; 5/653–655.3; 280/751; 108/43
See application file for complete search history.

(56) References Cited

U.S. PATENT DOCUMENTS

| | | | | |
|---|---|---|---|---|
| 3,784,224 A | * | 1/1974 | Peeler | 297/471 |
| 4,025,105 A | * | 5/1977 | Pekala | 297/4 |
| 4,052,944 A | * | 10/1977 | Jennings | 108/43 |
| 4,235,472 A | * | 11/1980 | Sparks et al. | 297/392 |
| 4,287,621 A | * | 9/1981 | Kertz | 5/636 |
| 4,610,463 A | * | 9/1986 | Efrom | 280/751 |
| 4,826,208 A | * | 5/1989 | Ozmar | 280/751 |
| 5,332,288 A | * | 7/1994 | Coates | 297/411.21 |
| 5,645,319 A | * | 7/1997 | Parks, Jr. | 297/391 |
| 5,816,663 A | * | 10/1998 | Steinle | 297/488 |
| D411,388 S | * | 6/1999 | Sacco et al. | D6/406.6 |
| 6,042,185 A | * | 3/2000 | Cowgur | 297/393 |
| 6,061,854 A | * | 5/2000 | Crowley | 5/655 |
| 6,957,612 B2 | * | 10/2005 | Conlee | 108/43 |
| 7,240,623 B2 | * | 7/2007 | Jarke et al. | 108/43 |
| 2004/0064893 A1 | * | 4/2004 | Sharp | 5/655.3 |
| 2006/0138297 A1 | * | 6/2006 | Esimai | 248/346.01 |

* cited by examiner

*Primary Examiner*—Laurie K Cranmer
(74) *Attorney, Agent, or Firm*—Clarence L. Albritton

(57) ABSTRACT

An elbow support apparatus with distal sides and front, back, upper and lower sides constructed as a cushioned or inflatable device having at least a flexible upper surface and a lower surface configured to fit on the lap of the driver of a motor vehicle when the driver is seated adjacent the steering wheel of the vehicle whereby the elbows of the driver are supported such that the driver's hands are maintained in the 9:15 position on the steering wheel; the device is provided with an apron attached to the front side, fasteners attached to each of the distal sides, plural fasteners attached to the back side, and plural, inverted u-shape locating members configured on the lower side of the cushion device.

7 Claims, 6 Drawing Sheets

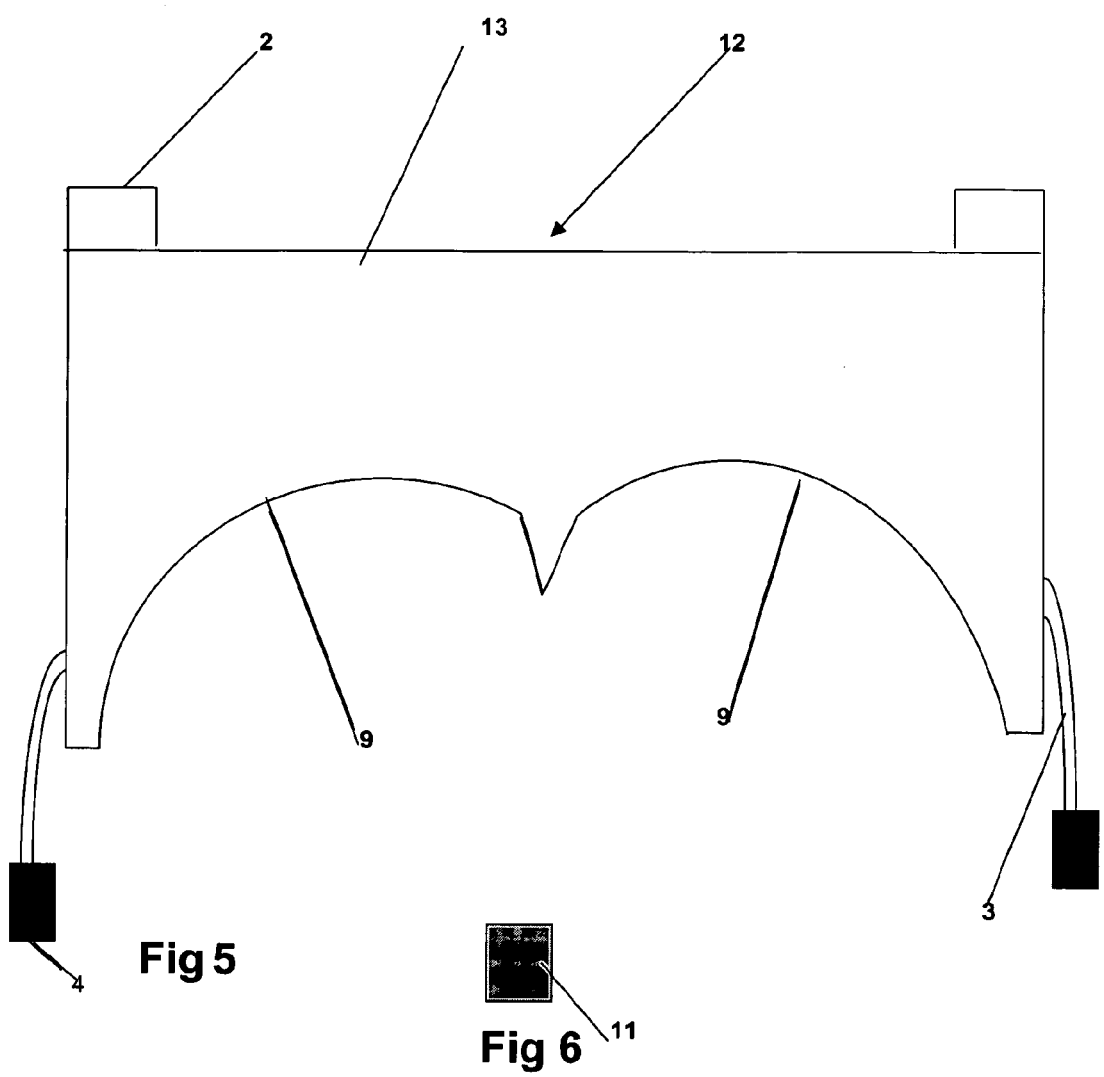

DRIVER'S ELBOW SUPPORT APPARATUS

BACKGROUND OF THE INVENTION

The driver's elbow support apparatus of this invention relates to a flexible, portable device constructed and arranged to solve the problems experienced by drivers of various vehicles including cars, trucks, vans or SUVs. Motor vehicles are provided with an arm rest on each door adjacent a passenger. Some cars are provided with an elbow support on a central console located between a driver and a front-seat passenger. The problem experienced by drivers is that their arms get tired when driving. The arm rests provided in motor vehicles are spaced to the extent that a driver would have to lean to one side or the other in order to use them. Leaning, in this sense, creates stress on the body and ultimately fatigue and an unsafe condition for long and short driving trips.

BRIEF SUMMARY OF THE INVENTION

It is an object of the present invention to provide a portable driver's elbow support with opposed sides and front, back, top and bottom side surfaces where the top surface is flexible and provided with sufficient firmness to support the downward force of a driver's elbows;

it is a further object of the present invention to provide a portable elbow support apparatus which is inflatable;

it is a further object of the invention to provide a portable, flexible cushion device with at least a flat upper side with at least a flat upper side with sufficient firmness to support a driver's elbows such that the driver's hands are supported in a nine-fifteen (9:15) position on a steering wheel in a motor vehicle;

it is a further object of the present invention to provide the portable, flexible elbow support cushion device with plural, inverted u-shape means configurations on the bottom side of the device constructed and arranged to conform comfortably to the driver's thighs above the vehicle's front seat;

it is a further object of the present invention to provide the front side of the support device with an apron as a means to cover the thighs and knees of the motor vehicle operator; and it is a further object of the present invention that the flexible cushion device provides protection to the lower portion of the driver's body in the event of a collision.

BRIEF DESCRIPTION OF THE SEVERAL VIEWS OF THE DRAWING

FIG. 5 is a front view the support device;
FIG. 6 is a complementary mounting patch for mounting the support device to the seat.

DETAILED DESCRIPTION OF THE INVENTION

Figure 1:
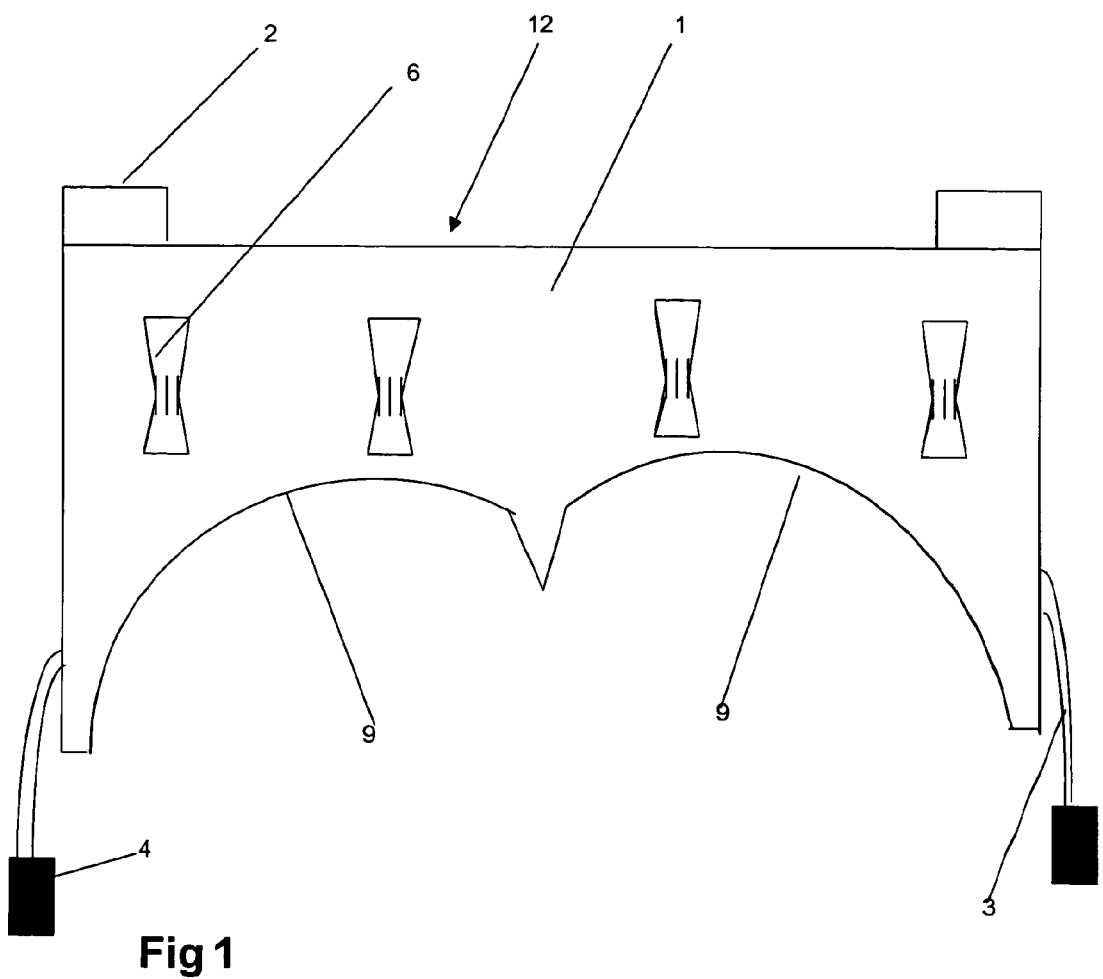
FIG. 1 is a rear view of the elbow support device.
Figure 2:
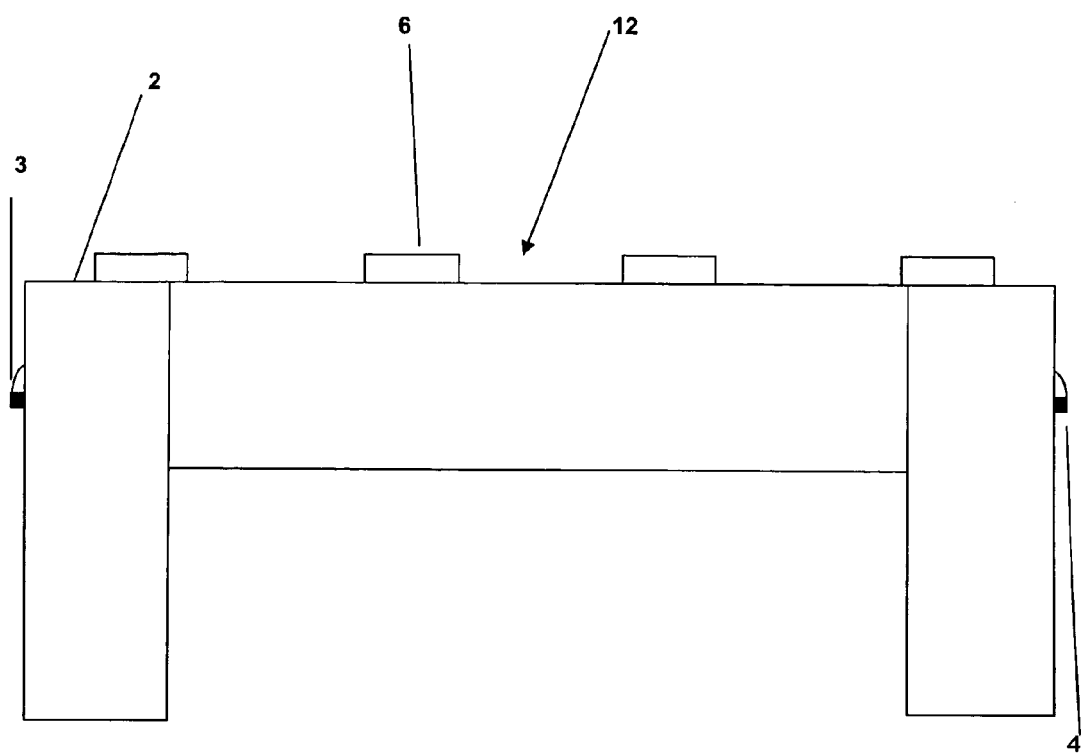
FIG. 2 is a top plan view of the invention.

The flexible elbow support apparatus is a cushion device 12 constructed to provide support to a driver's elbows and to protect the driver's abdomen from the impact of a steering wheel in a motor vehicle in the event of a collision. The cushion device is structurally provided with distal sides 10, top 2, front 13, back 1, and plural, inverted u-shape bottom side surfaces 9 arranged to be used in conjunction with the thigh area of the driver and the lap belt of a seatbelt restraining harness in the motor vehicle.

Figure 3:
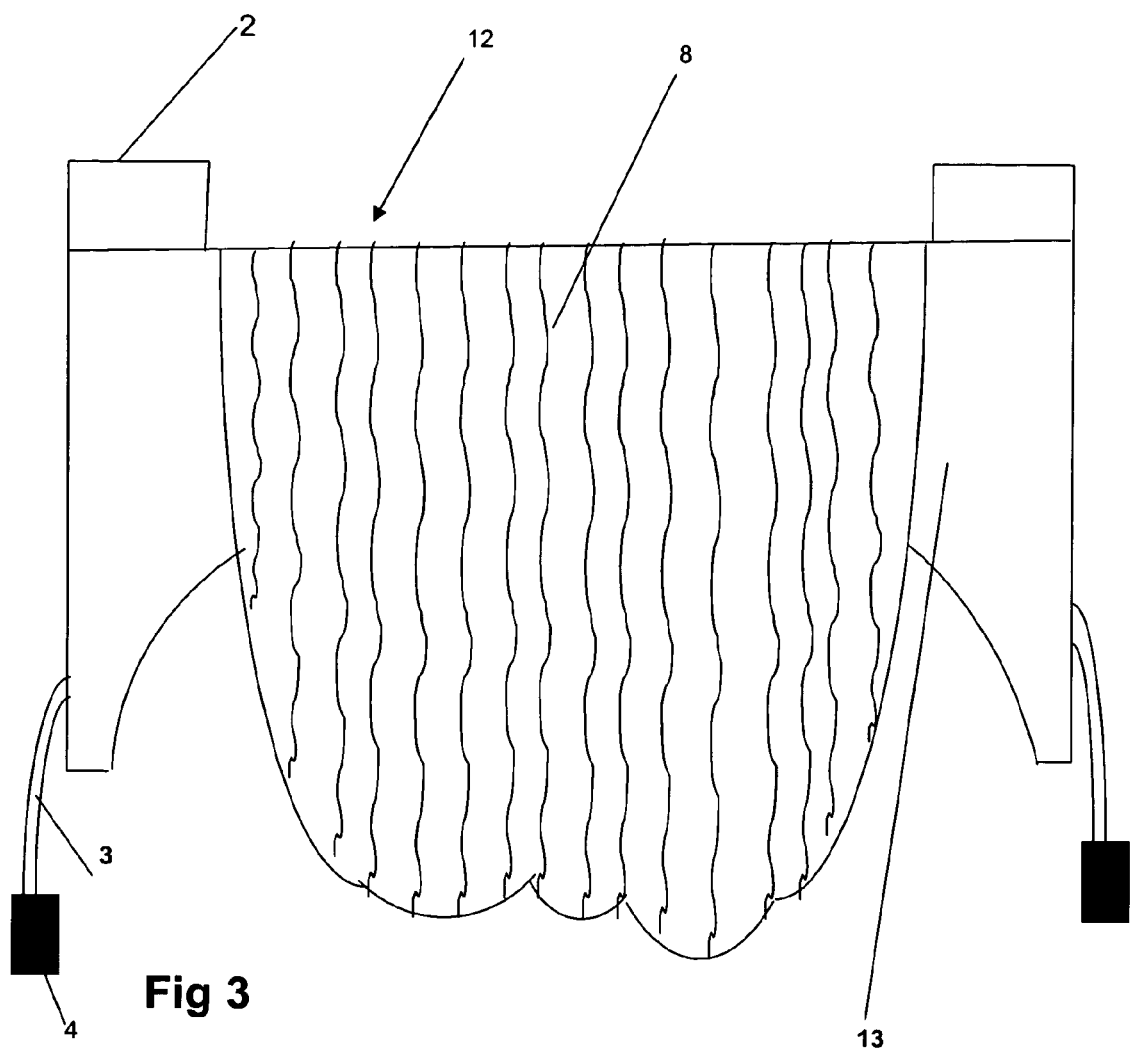
FIG. 3 is a front view of the support device with an attached apron.
Figure 4:
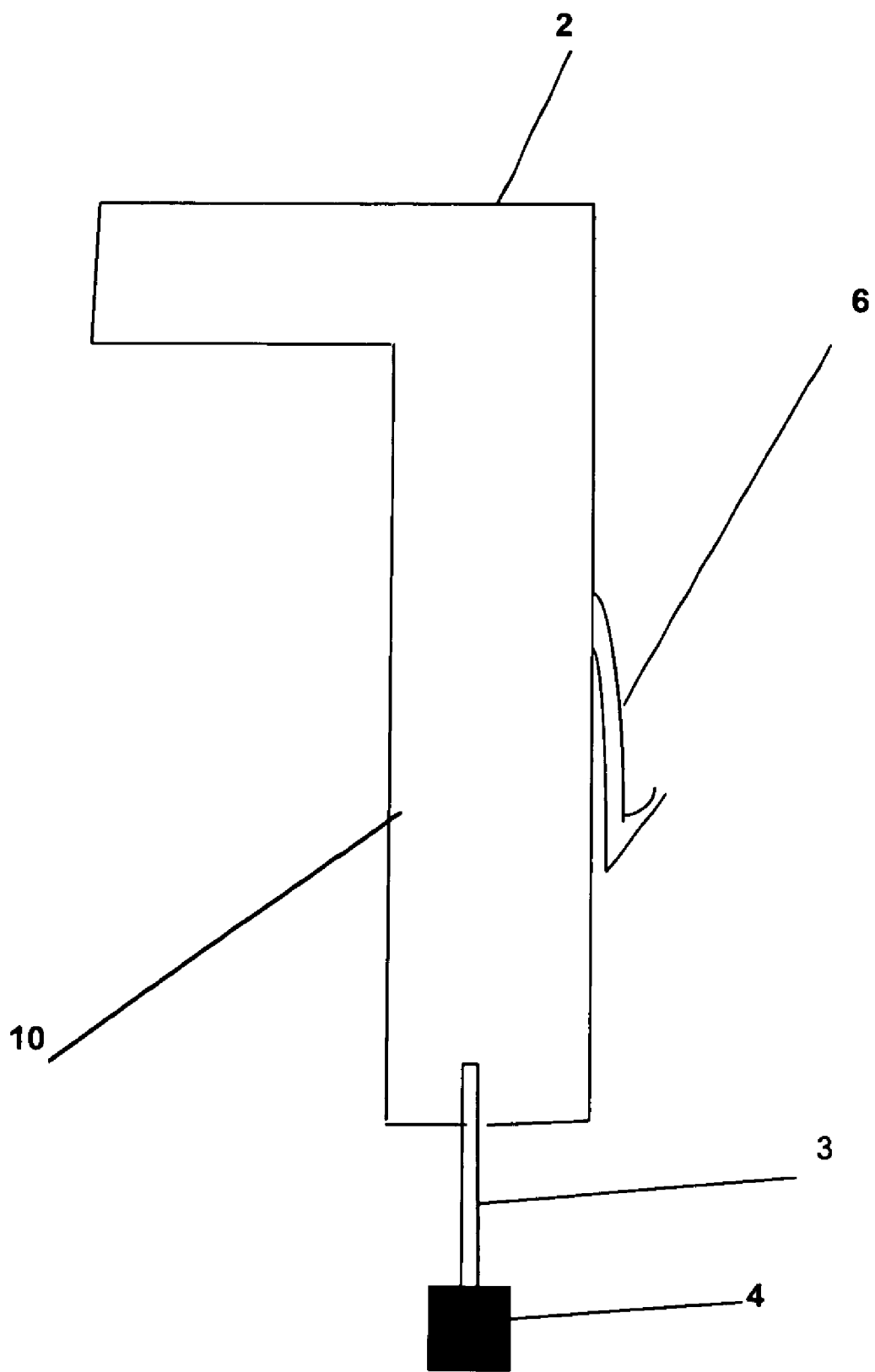
FIG. 4 is a side view of a support device.
Figure 7:
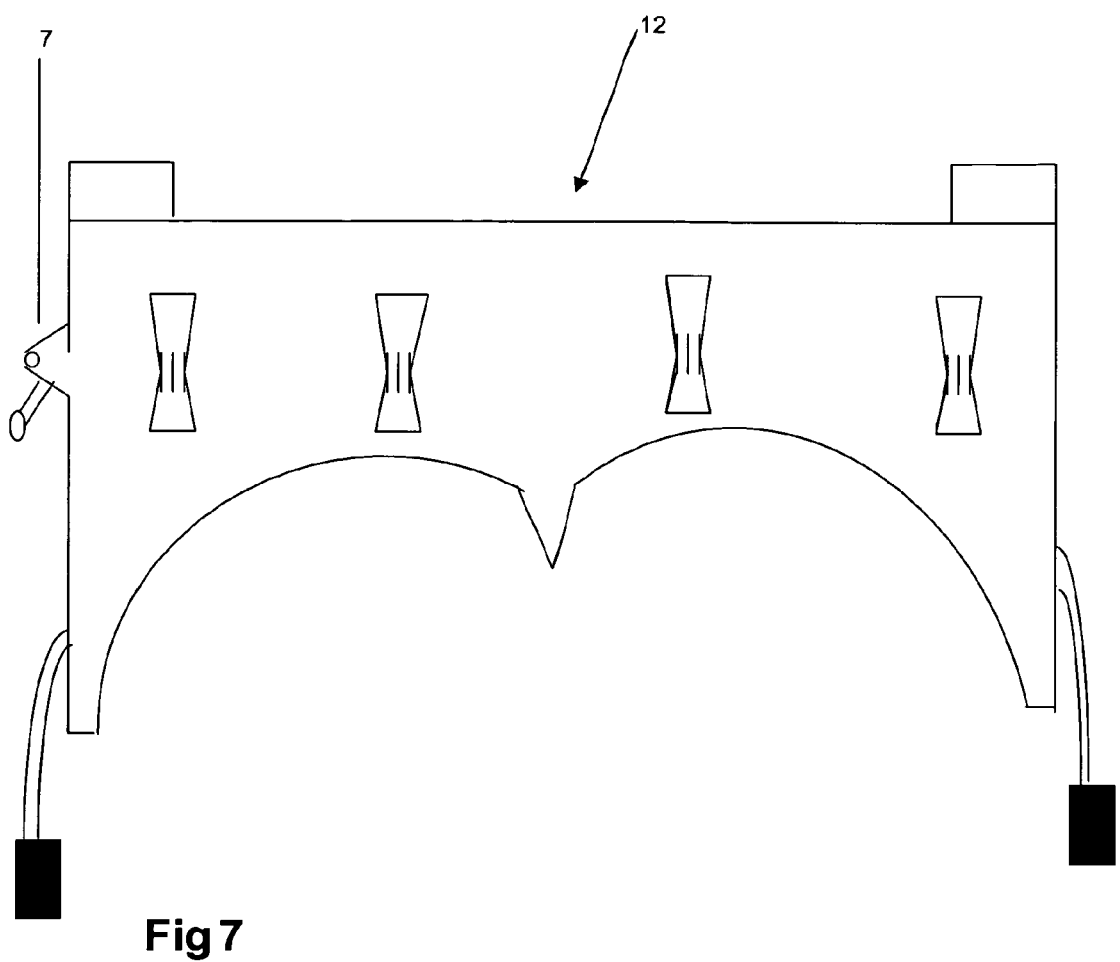
FIG. 7 is a front view of an inflatable version of the device.

Device 12 can be made from any soft material including foam rubber, inflatable plastic, rubber or stuffed cloth. FIG. 7 shows valve 7 on the inflatable version of the device. The top side of the device, including elbow supports 2, is flexible and constructed to support a driver's elbows so that a driver's hands can be positioned at a nine-fifteen (9:15) position on the steering wheel of the vehicle so that the driver can maintain better control of the vehicle and to rest the arms of the driver. Bottom-side surfaces 9 of the device are constructed with plural, inverted u-shape configurations so that the device can rest comfortably on the thighs of the driver above the seat of the vehicle. FIG. 3 shows a front side of the device provided with an apron 8 made of cloth or flexible, cushioned material attached to the front side thereof to protect the driver's clothing and to serve as a cushion-type covering for the thigh and knee area of the driver.

First fastening means includes pads 4 attached to distal sides of cushion 12 by straps 3 and complementary pads 11, shown in FIG. 6, attachable to the side and any other area of the seat for use in communication with pads 4 for restraining upward and lateral movement of the device.

Second fastening means 6, shown in FIG. 1, is a plurality of spring-loaded clips which aid in securing the device in the lap of the driver and to prevent forward movement of the device. The clips are attached to the lap belt of a seat-belt restraining harness. The device is provided with integrally-formed inverted u-shape configurations 9 in the bottom side thereof as a means for further locating the device on the lap of the driver.

Alternatively, device 12 can be supported on the driver's lap unattached to the seat in the vehicle.

What we claim as our invention:

1. An elbow-support apparatus comprising:
    An elbow-support cushion device provided with opposed sides and top, front, back and bottom sides;
    said cushion device arranged in removable mechanical communication with a shoulder-lap-belt harness in a vehicle, which shoulder harness is removably connected across a driver's shoulder to a latch assembly and providing undiminished driver protection;
    flexible cushion means constructed and arranged to support the elbows of a driver of a vehicle;
    a plurality of integrally formed inverted u-shape locating means formed on the bottom side of said flexible cushion device and constructed and arranged to fit the thigh areas of the driver to prevent lateral movement of said device;
    first fastening means attached to said opposed sides and to complementary mounting pads attachable to opposed sides of a front seat of a motor vehicle for restraining upward and lateral movement and to hold the cushion device steady in the driver's lap; and
    second fastening means attached to the back side of said cushion device and arranged in mechanical communication with the lap belt portion of the shoulder harness to prevent forward movement of the device.

2. An elbow-support cushion device as defined in claim 1, wherein the device is cloth stuffed with flexible material.

3. An elbow-support cushion device as defined in claim 1, wherein the device is foam rubber.

4. An elbow-support cushion device as defined in claim 1, wherein the device is an inflatable rubber cushion.

5. An elbow-support cushion device as defined in claim 1, wherein the device is an inflatable plastic cushion.

6. The cushion device of claim 1 wherein said second fastening means comprises a plurality of clamps attached to the back side of said elbow support cushion device.

7. The elbow-support cushion device as defined in claim 1, further comprising an apron attached to the front of the device for covering the lap and knee area of the driver.

* * * * *